US007900674B2

(12) United States Patent
Arena

(10) Patent No.: US 7,900,674 B2
(45) Date of Patent: Mar. 8, 2011

(54) LABELING MACHINE

(75) Inventor: Giorgio Arena, Frosinone (IT)

(73) Assignee: Open Data S.R.L., Frosinone (IT)

( * ) Notice: Subject to any disclaimer, the term of this patent is extended or adjusted under 35 U.S.C. 154(b) by 742 days.

(21) Appl. No.: 11/937,186

(22) Filed: Nov. 8, 2007

(65) Prior Publication Data

US 2008/0277068 A1 Nov. 13, 2008

(30) Foreign Application Priority Data

May 8, 2007 (IT) .............................. RM2007A0258
May 8, 2007 (IT) .............................. RM200700065

(51) Int. Cl.
*B65C 11/02* (2006.01)
*B65C 9/46* (2006.01)
*B29C 65/48* (2006.01)
*B32B 37/00* (2006.01)

(52) U.S. Cl. ......... 156/384; 156/387; 156/577; 156/579; 156/DIG. 48; 156/DIG. 49; 101/94; 101/110; 101/111

(58) Field of Classification Search .......... 156/384–388, 156/577, 579, DIG. 48, DIG. 49; 101/94, 101/110, 111, 288–295, 324
See application file for complete search history.

(56) References Cited

U.S. PATENT DOCUMENTS 3,231,446 A * 1/1966 Satas .............................. 156/384
3,342,662 A * 9/1967 Grasmann ...................... 156/384
3,551,251 A * 12/1970 Kazunosuke et al. ........ 156/384
3,582,433 A * 6/1971 Rothenberger ............... 156/384
3,611,929 A * 10/1971 Schrotz et al. ................ 101/362
3,656,430 A * 4/1972 Olsson .......................... 101/288
3,705,833 A * 12/1972 Wada ............................ 156/384
3,782,279 A * 1/1974 Carboni et al. ............... 101/288
3,800,701 A * 4/1974 Martin .......................... 101/288
3,852,139 A * 12/1974 Jenkins ......................... 156/250
3,890,188 A * 6/1975 Sams ............................ 156/384
3,923,582 A * 12/1975 Schroter et al. ............... 156/368
3,934,507 A * 1/1976 Geri .............................. 101/291
3,957,562 A * 5/1976 Hamisch, Jr. ................. 156/384
4,011,813 A * 3/1977 Sams ............................ 101/288
4,026,758 A * 5/1977 Sato .............................. 156/540
4,041,863 A * 8/1977 Mullen et al. ................. 101/269
4,051,780 A * 10/1977 Sato .............................. 101/305
4,075,944 A * 2/1978 Conley ............................ 101/94
4,091,728 A * 5/1978 Sato .............................. 101/288
4,111,736 A * 9/1978 Hamisch, Jr. ................. 156/384
4,131,504 A * 12/1978 Furutu .......................... 156/384
4,166,757 A * 9/1979 Hamisch, Jr. ................. 156/384
4,176,603 A * 12/1979 Sato .............................. 101/291
4,213,389 A * 7/1980 Sato .............................. 101/295
4,257,326 A * 3/1981 Sato .............................. 101/288

(Continued)

*Primary Examiner* — Philip C Tucker
*Assistant Examiner* — Sing P Chan
(74) *Attorney, Agent, or Firm* — Lackenbach Siegel, LLP; Andrew F. Young

(57) ABSTRACT

A labeling machine comprises a self-regulating arresting member of a label holder tape. The arresting member is able to press the tape against an abutting surface when a label has to be applied on a destination surface and it releases said tape when, on the action of a control device the tape is actuated to advance. The labeling machine further comprises a printing device whose inking roller is associated to a device that enables it to be engaged easily and conveniently on a respective support arm. The support arm in turn is advantageously connected to an access door to internal areas of the labeling machine, whose opening determines the exit of the support arm and the exposure of the inking roller.

25 Claims, 7 Drawing Sheets

U.S. PATENT DOCUMENTS 4,308,797 A * 1/1982 Becker et al. ................ 101/292
4,377,435 A * 3/1983 Fujita ........................... 156/384
4,384,525 A * 5/1983 Sato et al. ..................... 101/288
4,406,727 A * 9/1983 Fujita ........................... 156/384
4,451,323 A * 5/1984 Sato et al. ..................... 156/541
4,452,667 A * 6/1984 Chang ........................... 156/384
4,453,999 A * 6/1984 Holland-Letz ................ 156/361
4,498,389 A * 2/1985 Hamisch, Jr. ................ 101/288
4,518,454 A * 5/1985 Fujita ........................... 156/541
4,544,433 A * 10/1985 Schrotz et al. ................ 156/384
4,560,087 A * 12/1985 Sato et al. ....................... 221/73
4,699,685 A * 10/1987 Sato ............................. 156/384
4,985,110 A * 1/1991 Becker .......................... 156/540
5,013,390 A * 5/1991 Hermann ...................... 156/577
5,045,145 A * 9/1991 Becker .......................... 156/384
5,254,206 A * 10/1993 Wing ............................ 156/542
5,900,108 A * 5/1999 Sekine .......................... 156/384

* cited by examiner

LABELING MACHINE

CROSS REFERENCE TO RELATED APPLICATIONS

This application references and claims priority from Italian Application Ser. No. RM2007A000258 filed May 8, 2007. This application additionally claims priority from U.S. Design Pat. App. Ser. No. 29/297,000 filed Nov. 1, 2007 now U.S. Pat. No. Des. 607,491 which in-turn claims priority from Italian Design Ser. No. RM20070000065 filed May 8, 2007. The entire contents of each application are herein incorporated fully by reference.

FIGURE SELECTED FOR PUBLICATION

FIG. 1

BACKGROUND OF THE INVENTION

1. Field of the Invention

The present invention relates to a labeling machine. In particular, the present invention relates to a labeling machine with manual operation for applying labels bearing one or more captions, e.g. indications about the products whereon said labels are applied or the prices of the products. In further detail, the present invention is suitable for use in warehouses and/or in any commercial activity, such as department stores, supermarkets, shops and/or the like in which there is a need to affix various types of commercial and/or informational indications.

2. Description of the Related Art

The related art involves manually operated labeling machines that comprise a load-bearing structure, within which is provided a device for feeding a label-holder tape. The label-holder tape is appropriately guided within the load-bearing structure to an area of application of the labels, whereat each label borne by the tape is detached therefrom to be affixed on a respective surface of a package or product of interest.

To allow the advance of the label holder tape within the load-bearing structure, known labeling machines are provided with an appropriate actuating device which pulls the tape downstream of the application area, making it advance towards an area of discharge of the tape without the labels.

Conventional labeling machines are also provided with a device for stopping and/or breaking the tape to enable the application of each label without undesired dragging of the tape. In particular, known labeling machines comprise, between the device for feeding the tape and the area of application of the labels, a series of mechanisms which continuously press the label holder tape against an abutting surface present within the load-bearing structure. In this way, when a label that has been partially detached from the label holder tape is positioned on a destination surface by a combined action of pressure towards said surface and translation of the labeling machine thereon, the label holder tape is maintained in a fixed position, allowing the complete detachment of the label to be applied.

Conventional labeling machines further comprise a control device, usually constituted by a movable element which has an appropriate grip, operatively connected to the actuation device to bring, to the application area, consecutively to each other, the labels borne by the tape. In particular, when the control device is operated manually, the co-operation between the latter and the actuation device intensely drive the label holder tape which, overcoming the blocking forces exercised by the arresting device, advances as described above.

Within the structure is also provided a printing element able to deposit on each label, upstream of the application area, a predefined quantity of ink according to pre-set motifs, whereby the aforementioned commercial and/or informational indications are obtained.

While known labeling machines allow the printing and the satisfactory application of the labels on the packages and/or surfaces of the products of interest, the Applicant has noted that they are not free of serious and detrimental drawbacks, mainly, in relation to the operation and the wear of the arresting device, to the replacement and/or maintenance of one or more components of the printing device, as well as to the wear of the labels and/or of the label holder tape.

In particular, the related art has failed to appreciate that that the constant and continuous pressure of the arresting device on the label holder tape against the respective abutting surface, determines, in the long run, significant problems with the calibration of the components of said device, as well as excessive wear of the mechanical parts in rubbing or rolling relationship, requiring constant interventions to maintain and/or replace one or more components of the arresting device.

This serious detriment also has an impact on the general conditions of the label holder tape and on the labels themselves, which may be structurally compromised, presenting an aesthetically displeasing outside appearance and/or, worse yet, an irregular printing surface whereon the ink used is deposited imprecisely, giving rise to undesired imperfections.

It should also be noted that both the difficulty in accessing the internal areas of the load-bearing structure of known labeling machines, and the difficulty in replacing some components of the printing device, e.g. the inking roller and the like, normally provided, entails and intense maintenance activity, whilst requiring considerable manual skills of the maintenance operator who must, with particular instruments and tools, access the inking roller to extract it from the structure and replace it with another inking roller.

Accordingly, there is a need for an improved device that overcomes the detriments Applicants have noted in the conventional field.

ASPECTS AND SUMMARY OF THE INVENTION

An aspect of the present invention is to provide a solution that overcomes at least one of the drawbacks noted in the related art.

It is another aspect of the present invention to make available a labeling machine that is provided with a self-regulating braking system, i.e. able to manage the pressure of the tape against the corresponding abutting surface according to the advance or arrest of the tape.

A further aspect of the present invention is to provide a labeling machine whose replacement of the components of the printing device is easy and simple to perform.

Additionally, an aspect of the invention is to assure the structural integrity of the labels and of the label holder tape, while assuring the quality of the print effected by the printing device.

The present invention relates to a labeling machine comprises a self-regulating arresting member of a label holder tape. The arresting member is able to press the tape against an abutting surface when a label has to be applied on a destination surface and it releases the tape when, on the action of a control device the tape is actuated to advance. The labeling machine further comprises a printing device whose inking roller is associated to a device that enables it to be engaged easily and conveniently on a respective support arm. The support arm in turn is advantageously connected to an access door to internal areas of the labeling machine, whose opening determines the exit of the support arm and the exposure of the inking roller.

According to one aspect of the present invention, there is provided a labeling machine comprising: one of a structure, an operating structure, and a supporting structure, at least one member for feeding a tape provided with a plurality of labels associated to the structure, guiding means associated to the structure to drive the tape at least between the feeding member and an area, defined in the structure, for the application of at least one label, the guiding means defining a path of advance of the tape, at least one device for actuating the tape positioned in the structure, the actuating device being movable between a non operative condition in which the tape remains in a predetermined position, and an operative condition, in which the actuating device induces in actuation the tape along the path of advance to bring at least one label of the tape to the area of application, at least one device for arresting the tape operatively positioned in the structure, the arresting device being movable between an arresting position, in which it inhibits the actuation of the tape pressing it against an abutting surface associated to the structure, and a release condition, in which the pressure of the tape against the abutting surface decreases and the tape is free to advance along the path of advance, at least one control device operatively associated to the structure and operatively connected to the arresting member and actuating device to bring, at the application area, at least one label present on the tape, the control device being movable between a first position in which the arresting member is in condition of arrest and the actuating member is in non operative condition, and a second position in which the arresting device is in release condition and the actuating device is in operative condition.

According to another aspect of the present invention, there is provided a labeling machine wherein: a first element pivotally engaged to the structure to rotate around an axis of rotation, the first element being operatively connected to the control device so that the movement of the control device between the first and the second condition determines the actuation of the arresting device between the arresting condition and the release condition, a second element pivotally engaged to the structure to rotate around the axis of rotation, the second element engaging the tape to lock the tape against the abutting surface when the arresting device is in arresting condition and to allow the advance of the tape along the path of advance when the arresting device is in release condition, at least one elastic connecting element interposed between the first and second element to connect the first and second element whilst allowing relative rotations around the axis of rotation, the elastic connecting member thrusting the second element against the abutting surface when the arresting device is in arresting condition.

According to another aspect of the present invention, there is provided a labeling machine wherein: the arresting device comprises two elastic spring members operatively interposed between a respective hitching portion of the first element and a respective engaging portion of the second element positioned in proximity to each other.

According to another aspect of the present invention, there is provided a labeling machine wherein: the arresting device further comprises an auxiliary elastic member, operatively interposed between an abutting portion of the first element and an abutting surface of the second element oriented opposite to the contrasting surface, the auxiliary elastic member co-operating with the at least one elastic member to enhance the thrusting action of the second element against the contrasting surface when the arresting device is in arresting condition.

According to another aspect of the present invention, there is provided a labeling machine wherein: the control device comprises at least one thrust portion directly engaged against one end of the first element of the arresting member opposite the second element, the thrust portion maintaining the arresting member in arresting condition when the control device is in first condition and allowing the reduction of the pressure against the abutting surface when the control device is in second condition.

According to another aspect of the present invention, there is provided a labeling machine wherein: the actuating device comprises at least one drive roller pivotally engaged to the structure along the path of advance of the tape and downstream of the area of application of the at least one label, the drive roller partially defining the path of advance of the tape and being able to be actuated in rotation according to a predefined angle of rotation to advance the tape according to a respective predetermined measure of advance.

According to another aspect of the present invention, there is provided a labeling machine wherein: the control device is operatively connected to the drive roller to actuate the drive roller in rotation around a respective axis of rotation when the arresting member is in release condition.

According to another aspect of the present invention, there is provided a labeling machine wherein: the drive roller comprises: a plurality of actuating projections operatively engaged by an actuating member interposed between the drive roller and the control device, the actuating member operating, on the action of the control device, consecutively on each actuating projection to rotate the drive roller around the respective axis of rotation and according to a predefined angle or rotation, a plurality of locking projections operatively engaged by a respective locking member to inhibit rotations in an opposite direction to the rotations imparted by the actuating member to the drive roller.

According to another aspect of the present invention, there is provided a labeling machine comprising: at least one printing device operatively associated to the structure to deposit on at least one label borne by the tape a predefined quantity of ink, according to a pre-set motif, the printing device being movable, under the action of the control device, between a resting condition coinciding with the first position of the control device in which the printing device is distanced from the tape, and a printing condition coinciding with the second position of the control device, in which the printing device operates on a respective label of the tape.

According to another aspect of the present invention, there is provided a labeling machine wherein: the printing device comprises: at least one support element operatively associated to the structure, the support element having on free end, at least one inking roller, removably engaged to the support element.

According to another aspect of the present invention, there is provided a labeling machine further comprising: at least one engaging device operatively able to be operatively interposed between the support element and the inking roller to allow, integrally with the inking roller, the removable engagement thereof to the support element.

According to another aspect of the present invention, there is provided a labeling machine wherein: the engaging device comprises snap-in engaging means for engaging the inking roller to the support element.

According to another aspect of the present invention, there is provided a labeling machine wherein: the engaging device comprises a substantially "U" shaped roller holder structure, comprising two lateral portions each provided with a respective seat for the pivotal engagement of a corresponding longitudinal pivot of the inking roller and a central connecting portion interposed between the lateral portions.

According to another aspect of the present invention, there is provided a labeling machine wherein: the engaging device further comprises two connecting elastic members, each operatively engaged externally to a respective lateral portion of the roller-holder structure, each elastic connecting element being movable between a first position in which it is distanced from the respective lateral portion of the roller-holder structure and a second position in which it is approached to the respective lateral portion of the roller-holder structure.

According to another aspect of the present invention, there is provided a labeling machine wherein: each elastic connecting element has, at the opposite part from the respective lateral portion of the roller-holder structure, at least one hitching projection adapted to engage at least one respective hitching seat obtained internally in a respective supporting projection of the support element, and at least one thrust edge whereby the respective hitching projection is moved from the first to the second position, the hitching projection engaging the respective hitching seat when the roller-holder structure is engaged between two supporting projections of the supporting element.

According to another aspect of the present invention, there is provided a labeling machine comprising: at least one door having a first end hinged to the structure, and a second end, opposite to the first end, provided with at least one element for locking the door on the structure, the door being able to rotate around a hinge axis defined in the first end between a closed position in which the structure is closed by the door and an open position, in which the door is partly removed from the structure and at least one inner area thereof is accessible from the exterior.

According to another aspect of the present invention, there is provided a labeling machine wherein: the support element of the inking roller is hinged, at the side opposite its own free end, to the second end of the door, the support element being positioned within the structure when the door is in closed position and being positioned at least partially outside the structure when the door is in open position to facilitate access to the inking roller.

According to another aspect of the present invention, there is provided a labeling machine comprising: an elastic tape-guide device removably fastened, at its own ends, to the structure to maintain the tape pressed on the drive roller, the elastic tape-guide having a first end hinged to the structure, by means of two pivots, and a second end, hinged to the structure, by means of a shaft which engages within respective hinging holes obtained on the tape-guide device and on two laminar sections partially forming the structure thereof.

According to another aspect of the present invention, there is provided a labeling machine comprising: a structure, at least one member for feeding a tape provided with a plurality of labels associated to the structure, guiding means associated to the structure to guide the tape at least between the feeding member and an application area of at least one label defined in the structure, the guiding means defining a path of advance of the tape, at least one device for actuating the tape positioned in the structure, the actuating device being movable between a non operative condition in which the tape remains in a predetermined position, and an operative condition, in which the actuating device induces in actuation the tape along the path of advance to bring at least one label of the tape at the application area, at least one printing device operatively associated to the structure to deposit on at least one label borne by the tape a predefined quantity of ink, according to a pre-set motif, the printing device comprising at least one support element operatively associated to the structure, an inking roller removably engaged to the supporting element and at least one engaging device operatively and integrally engaged to the inking roller to allow the removable engagement thereof on the support element, at least one control device operatively associated to the structure and operatively connected to the actuation device and printing device, to print the motif on a label and bring the label to the area of application, the control device being movable between a first position in which the actuating device is in non operative condition and the printing device is in resting condition and a second position in which the actuating device is in operative condition and the printing device is in printing condition.

According to another aspect of the present invention, there is provided a labeling machine wherein: the engaging device has snap-in engaging means for the engagement of the inking roller to the support element.

According to another aspect of the present invention, there is provided a labeling machine wherein: the engaging device comprises a substantially "U" shaped roller-holder structure, having two lateral portions each provided with a respective seat for the pivotal engagement of a respective longitudinal pivot of the inking roller and a central connecting portion interposed between the lateral portions.

According to another aspect of the present invention, there is provided a labeling machine wherein: the engaging device further comprises two elastic connecting elements each operatively engaged externally to a respective lateral portion of the roller-holder structure, each elastic connecting element being movable between a first position in which it is distanced from the respective lateral portion of the roller-holder structure and a second position in which it is approached to the respective lateral portion of the roller-holder structure.

According to another aspect of the present invention, there is provided a labeling machine wherein: each elastic connecting element has, at the opposite side relative to the respective lateral portion of the roller-holder structure, at least one hitching projection adapted to engage at least one respective hitching seat obtained internally in a respective support projection of the support element, and at least one thrust edge whereby the respective elastic connecting element is moved from the first to the second position, the hitching projection engaging the respective hitching seat when the roller-holder structure is engaged between two support projections of the support element.

According to another aspect of the present invention, there is provided a labeling machine comprising: at least one door having a first hinged end to the structure, and a second end, opposite the first end, provided with at least one element for locking the door on the structure, the door being able to rotate around a hinging axis defined in the first end between a closed position in which the structure is closed by the door and an open position, in which the door is partly removed from the structure and at least one inner area thereof is accessible from the exterior.

According to another aspect of the present invention, there is provided a labeling machine wherein: the support element of the inking roller is hinged, at the side opposite its own free end, to the second end of the door, the support element being positioned within the structure when the door is in closed position and being placed at least partially outside the structure when the door is in open position to facilitate access to the inking roller.

According to another aspect of the present invention, there is provided a labeling machine comprising: an elastic tape-guide device removably fastened, at its own ends to the structure to maintain the tape pressed on the driving roller, the elastic tape-guide device having a first end hinged to the structure by means of two pivots, and a second end, hinged to the structure, by means of a shaft which engages within respective hinging holes obtained on the tape-guide device itself and on two laminar sections partially forming the structure thereof.

The above, and other objects, features and advantages of the present invention will become apparent from the following description read in conduction with the accompanying drawings, in which like reference numerals designate the same elements.

BRIEF DESCRIPTION OF THE DRAWINGS

Further characteristics and advantages shall become more readily apparent from the detailed description of a preferred, but not exclusive, embodiment of a labeling machine, in accordance with the present invention. The description shall be provided below with reference to the accompanying figures, provided purely by way of non-limiting indication, in which.

DETAILED DESCRIPTION OF THE PREFERRED EMBODIMENTS

Figure 1:
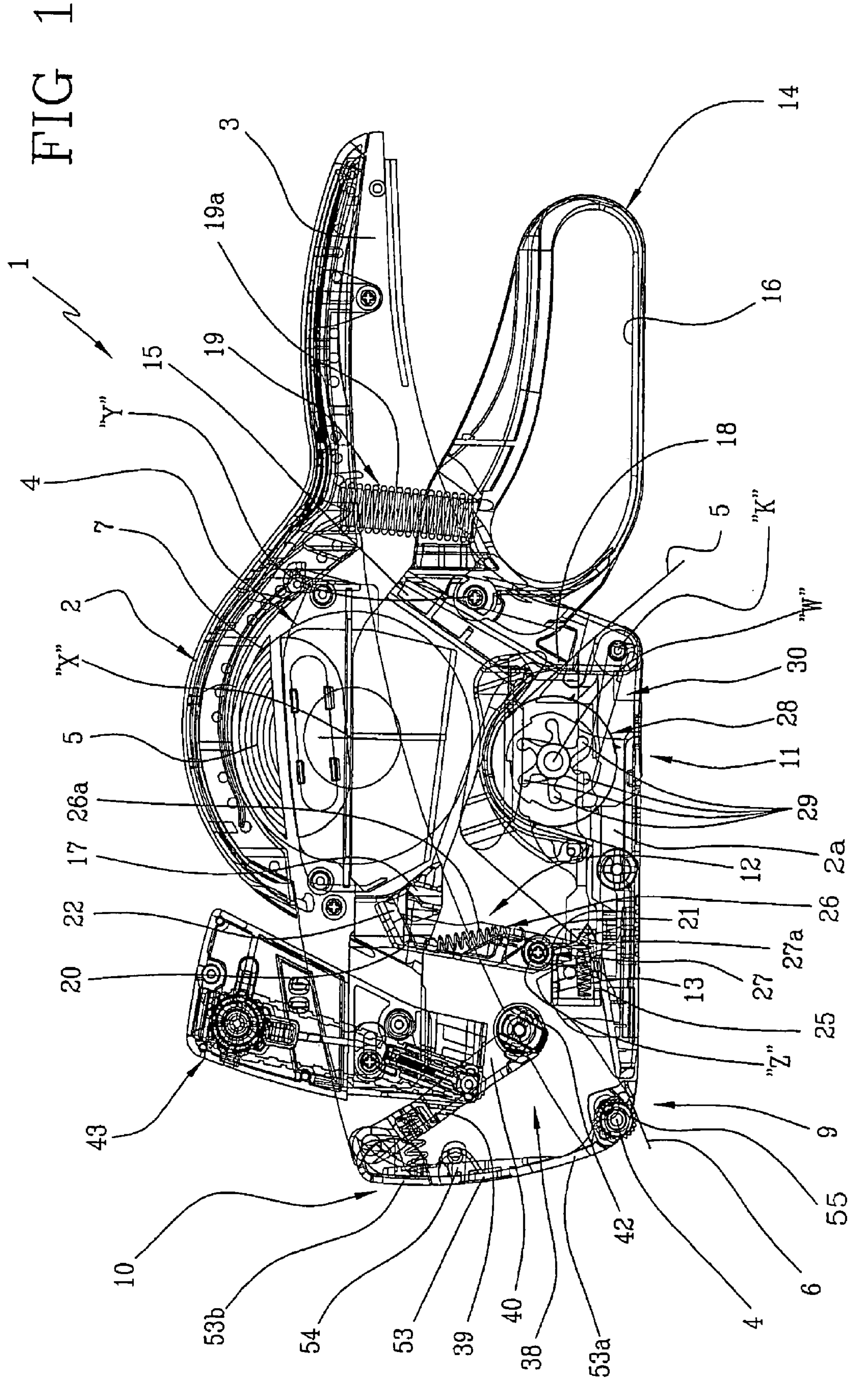
FIG. 1 is a schematic section of a labeling machine according to the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

With reference to the accompanying figures, the number 1 globally indicates a labeling machine, in accordance with the present invention.

Figure 2:
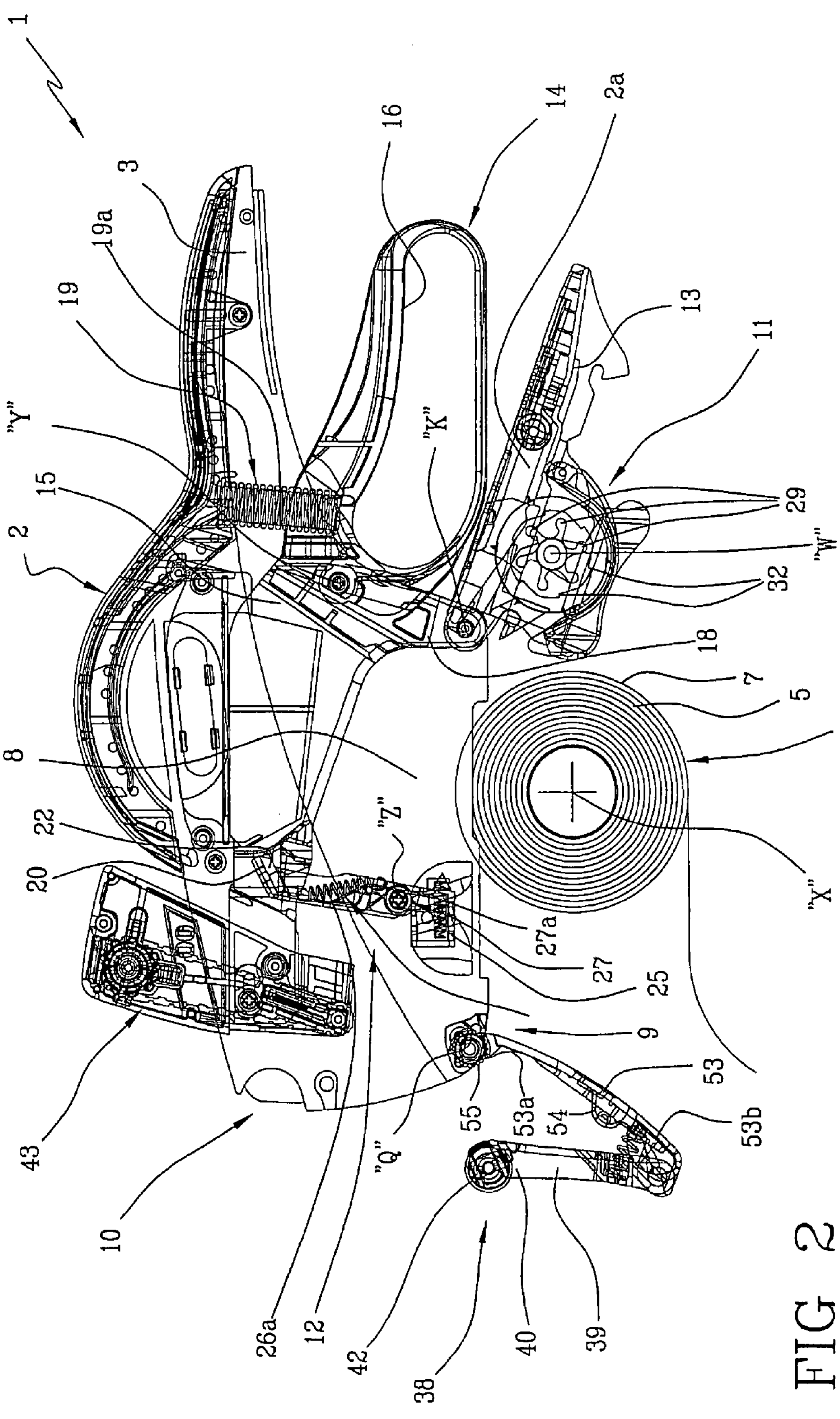
FIG. 2 is an additional schematic section of the labeling machine of the previous figure, shown in an open condition.

As shown in FIGS. 1 and 2, the labeling machine 1 comprises a substantially closed structure 2 presenting a handle 3, preferably coated with a co-molded rubber shell 2*b*, positioned posteriorly for the manual engagement of the labeling machine.

Within the structure 2, in a substantially central area, is provided an element 4 for feeding a tape 5 provided with a plurality of labels 6 (whereof one is schematically shown in FIG. 1) to be printed and affixed onto the outer surfaces of corresponding packages, labels and/or products.

As shown in FIGS. 1 and 2, the feeding element 4 preferably comprises a feeding reel 7 pivotally engaged to the structure 2 to rotate around a respective axis of rotation "X".

Advantageously, the feeding reel 7 is removably engaged to the structure 2 in such a way that it can be removed therefrom when the feeding reel 7 is completely empty.

As shown in FIG. 2, the feeding reel 7 can advantageously be inserted or extracted through an appropriate access opening 8 obtained in a lower part of the structure and appropriately kept closed by additional components of the labeling machine which shall be described below.

To guide the tape 5 at least between the feeding element 4 and an area 9 of application of at least one label 6, the structure 2 is provided with appropriate guidance means which define, according to a predetermined route, a path of advance of said tape 5.

As shown in FIG. 1, the guiding means lead the tape 5 from the feeding element 4 to the application area 9 which is preferably located inferiorly to the structure 2 of the labeling machine 1 in proximity to a front portion 10 thereof.

The labeling machine further comprises at least device 11 for actuating the tape 5 operatively located within the structure 2. The actuating device 11 is movable from a non operative condition in which the tape 5 does not move, remaining in a predetermined position, and operative condition, in which the actuating device 11 induces the tape 5 to move along the path of advance defined by the guiding means to bring at least one label 6 of the tape 5 to the area of application 9.

Again with reference to FIGS. 1 and 2, the labeling machine further comprises an element 12 for arresting the tape 5 operatively positioned within the structure 2. The arresting element 12 is movable between a condition of arrest, in which it inhibits the actuation of the tape 5 pressing the latter against an abutting surface 13 associated with the structure itself, and a condition of release, in which the pressure of the tape 5 against the abutting surface 13 decreases according to a value such that the tape 5 is free to advance along the aforementioned path of advance.

In order to operate both the actuating device 11 and the arresting element 12, the labeling machine comprises at least one control device 14 operatively associated to the structure 2, preferably inferiorly to the handle 3. The control device 14 is operatively connected to the arresting element 12 and to the actuating device 11 to bring, to the application area 9, at least one label 6 present on the tape 5.

More in particular, the control device 14 comprises a control lever 15 hinged to the structure 2 of the labeling machine 1 in a rear area thereof to oscillate around a respective axis of rotation "Y". The control lever 15 has, inferiorly to the handle 3, a grip portion 16 shaped ergonomically to facilitate and ease the manual grasping thereof. The control lever 15 develops prevalently within the structure 2 presenting a first control portion 17 located in proximity to the arresting element 17 and a second control portion 18 located in proximity to the actuating device 11.

Advantageously, at least one contrasting elastic element 19, preferably a helical spring 19*a*, is operatively interposed between the grip portion of the control device 14 and the handle 3 of the structure 2 to maintain the latter in a predetermined position.

Advantageously, the control device 14 can be moved between a first position in which the arresting element 12 is in arresting condition and the actuating device 11 is in non operative condition (FIG. 1), and a second position in which the arresting element 12 is in release condition and the actuating device 11 is in operative condition, i.e. in condition of pulling the tape 5 that unwinds the respective feeding reel 7.

In greater detail, the movement of the control device 14 from the first to the second position takes place by manually pressing the grip portion 16 of the control lever 15 that consequently rotates around the axis of rotation "Y" counter-clockwise. The grip portion 16 approaches the handle 3 pressing the helical spring 19*a* and the respective control portions 17, 19 move determining a change of state relative to the arresting element 12 that reduces its load on the tape 5 and the actuating device 11 that drives the tape 5 along the path of advance.

On the contrary, if the manual action of approach of the grip portion 16 to the handle 3 is interrupted, the control device 14 tends to return to the initial position, i.e. completely removed from the handle 3, rotating clockwise around the axis of rotation "Y".

Figure 3:
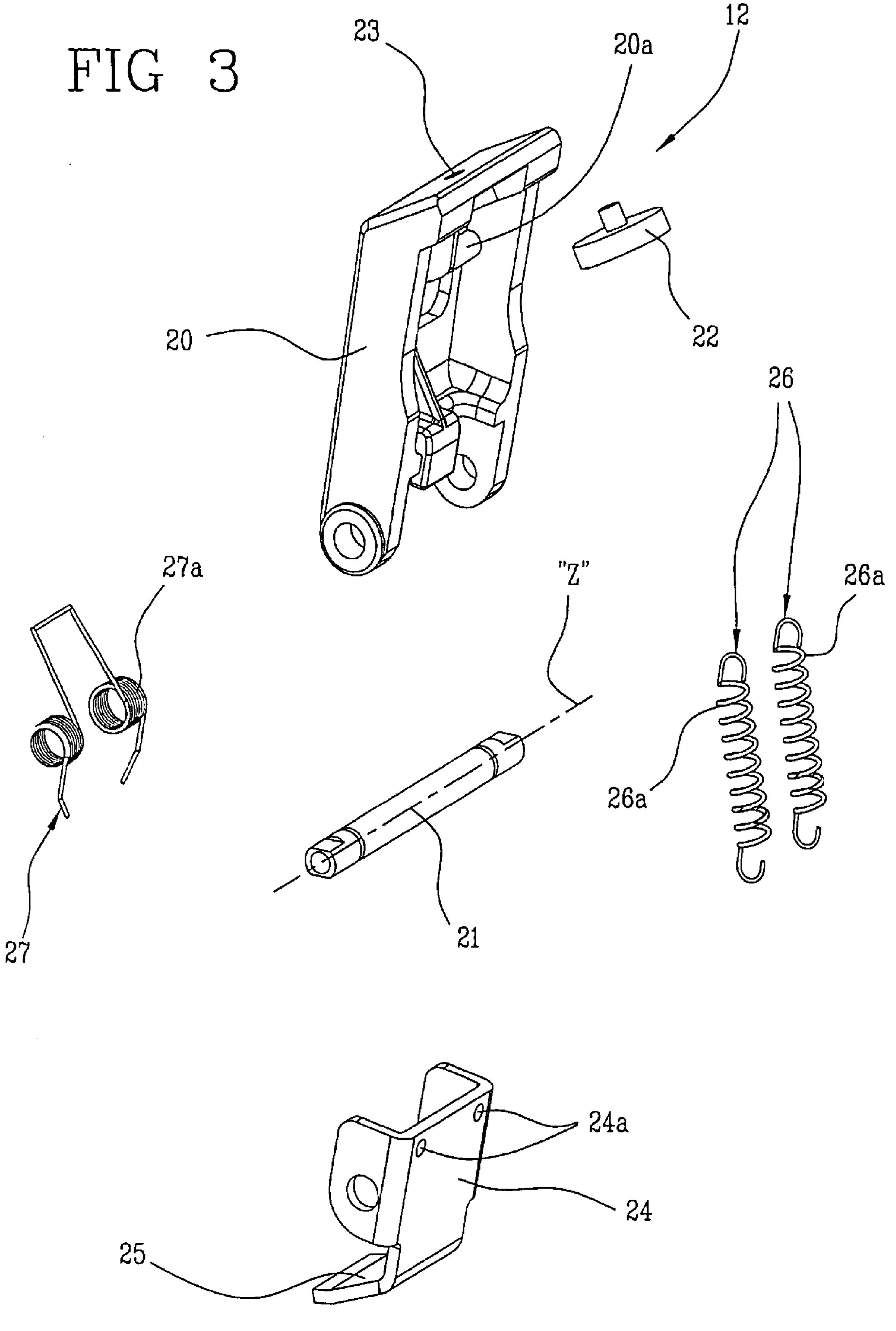
FIG. 3 is a representation of a first detail of the labeling machine of the previous figures, shown in a perspective exploded view.
Figure 5:
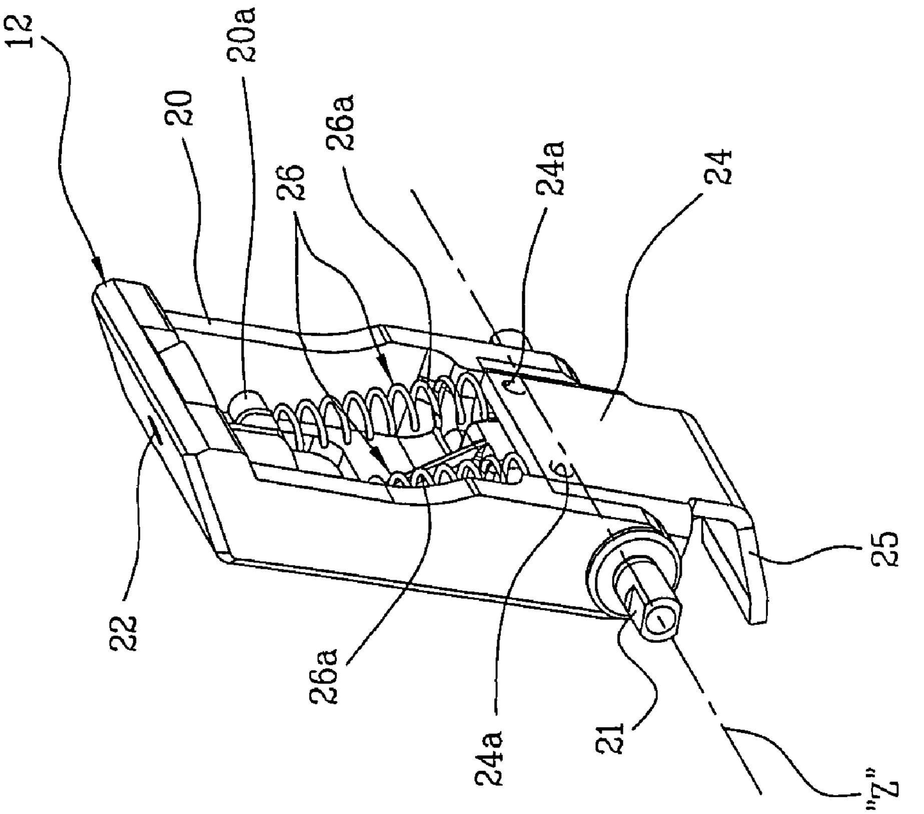
FIG. 5 is a rear perspective view of the detail of FIGS. 3 and 4.
Figure 4:
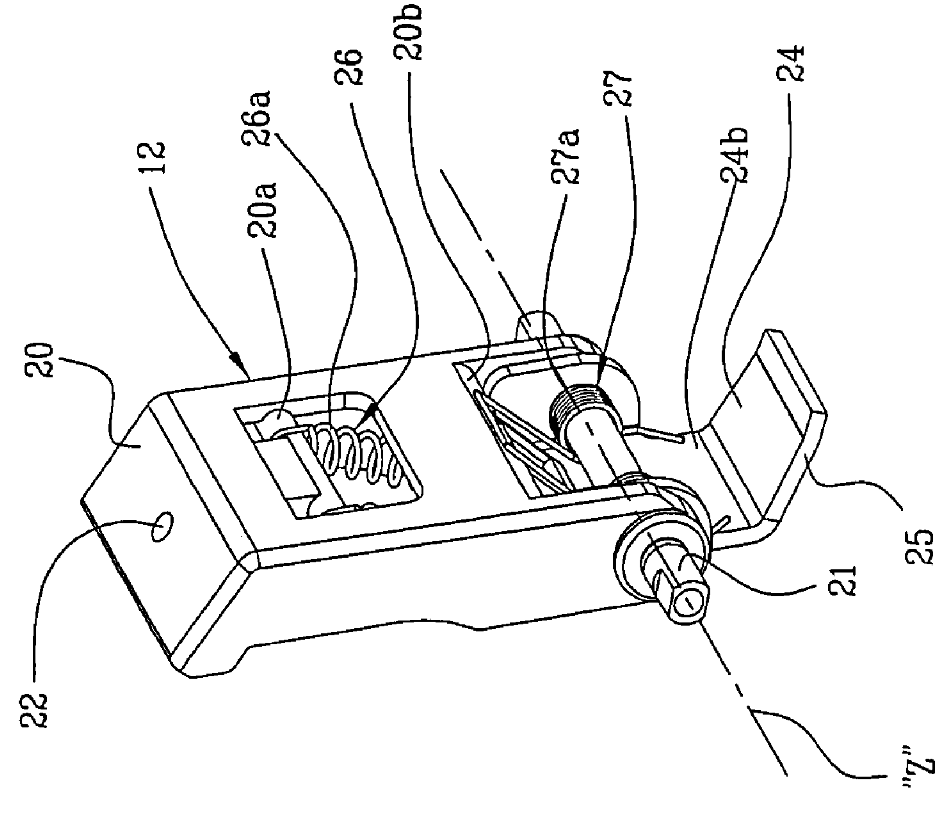
FIG. 4 is a front perspective view of the detail of the previous figure.

With reference to FIGS. 1-5, and in particular to FIGS. 3-5, the aforementioned arresting device 12 comprises, in detail, a first element 20, preferably made of plastic material, pivotally engaged to the structure 2 by means of a hinging pivot 21 which defines a respective axis of rotation "Z" substantially parallel to the axis of rotation "X" and "Y" respectively of the feeding reel 7 and of the control lever 15. At the opposite site from the hinging pivot 21 the first element 20 has a small engagement 22, preferably metallic, engaged, advantageously by co-molding, in a respective seat 23. The engagement disk 22 is operatively connected to the first control portion 17 of the control device 14 so that the movement thereof between the first and the second condition determines the actuation of the arresting device 12 between the arresting condition and the release condition.

Again with reference to FIGS. 3 through 5, the arresting elements 12 comprises a second element 24, preferably metallic, pivotally engaged to the structure 2 by means of the hinging pivot 21 in such a way as to rotate around the axis of rotation "Z". Advantageously, the second element 24 has an inclined portion 25 that engages the tape 5 to block it against the abutting surface 13 when the arresting device 12 is in arresting condition and to allow the advance of the tape itself along the path of advance when the arresting device 12 is in release condition.

The arresting element 12 comprises at least one elastic connection member 26 interposed between the first and the second element 20, 24 to connect the latter and at the same time to allow relative rotations around the axis of rotation "Z".

The interaction between the elastic connecting member 26, the first and the second element 20, 24, the control device 14 and the tape 5 on the abutting surface 13, determines, in arrest condition, a thrust by the elastic connecting member 26 on the second element 24 against the abutting surface 13. In other words, when the control device 14 is in the first position, the first portion 17 of the control lever 15 pushes the engagement disk 22 of the first element 20 of the arresting member 12 upwards by the action of the contrasting spring 19*a*. In practice, the first control portion 17 of the control lever 15 has a shaped screw 17*a* a shaped head 17*b* whereof is directly engaged to the engagement disk 22 present in the end of the first element 20 of the arresting member 12 that is opposite to the second element 24.

Being fastened in the pivot 21, the first element 20 tends to rotate counter-clockwise (FIGS. 1-3 and 5) tensioning the elastic member 26 which induces the second element 24 in rotation around the axis "Z" and counter-clockwise. The rotation of the second element 24 is, however, contrasted by the contrasting surface 13, transforming itself into a thrust equal to the force exercised by the elastic member 26 on the second element 24 and on the contrasting surface 13. Naturally, a push of the tape 5 against the contrasting surface 13 causes its blocking.

On the contrary if the control device 14 is moved from the first to the second position, the first control portion 17 of the control lever 15 no longer pushes against the metallic disk 22, enabling the elastic member 26 to unload, freeing the tape 5 which can thus slide.

Again with reference to FIGS. 3 to 5, the arresting device 12 comprises two elastic member 26, preferably traction springs 26*a*, operatively interposed between a respective hitching portion 20*a* of the first element 20 and a corresponding engagement portion 24*a* of the second element 24 positioned in proximity to each other.

The arresting device 12 further comprises an auxiliary elastic member 27, preferably a torsion spring 27*a*, operatively interposed between an abutting portion 20*b* (FIG. 4) of the first element 20 and an abutting surface 24*b* (FIG. 5) of the second element 24, oriented substantially opposite relative to the contrasting surface 13. The auxiliary elastic member 27 co-operates with the elastic members 26 to enhance the thrusting action of the second element 24 against the contrasting surface 13 when the arresting device 12 is in arresting condition and assure the tensioning of the tape 5 when the control device 14 is in the second position in such a way as to obtain the correct detachment of the labels from the tap in the application area 9.

Figure 7:
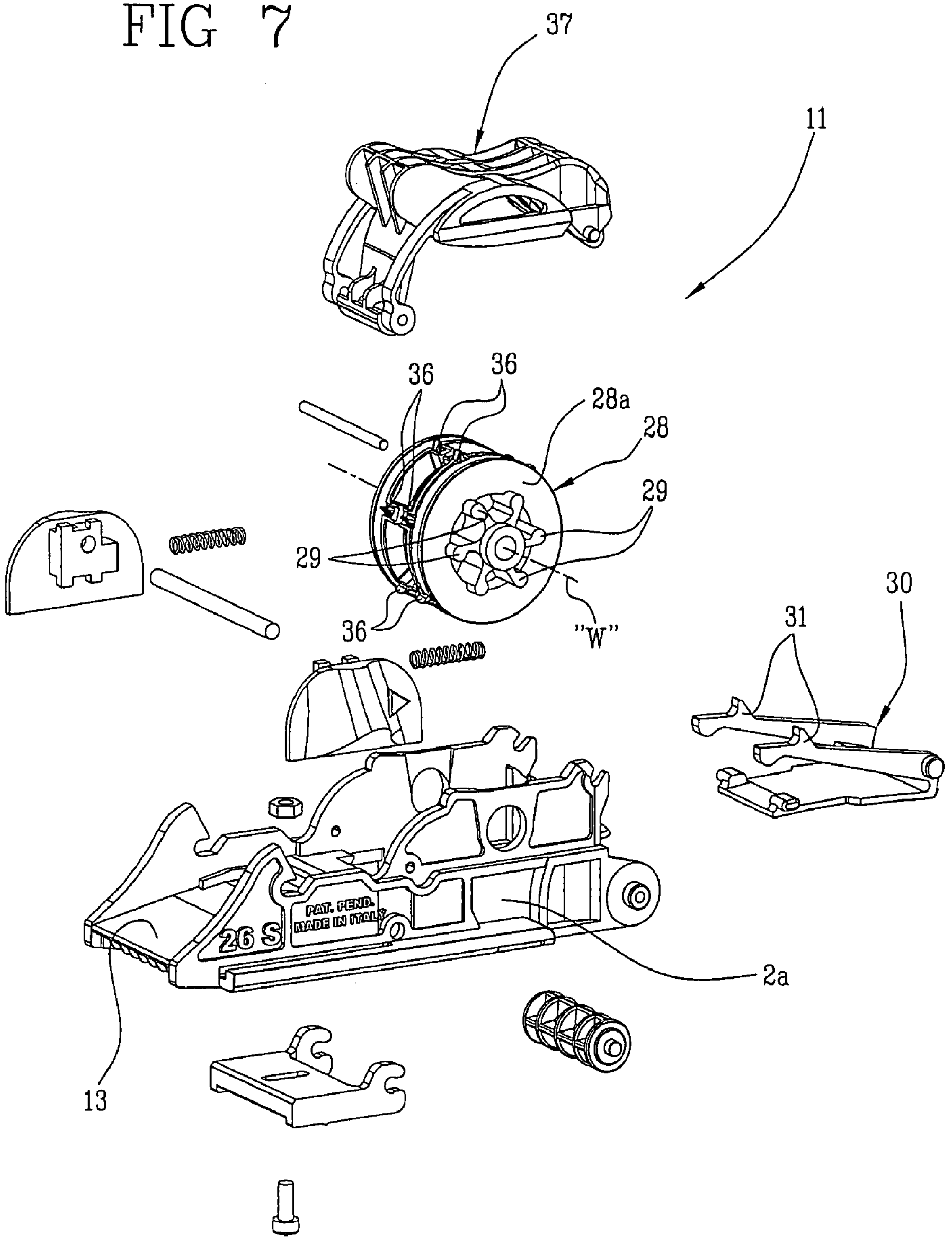
FIG. 7 shows a third detail of the labeling machine, shown in perspective and in exploded view.
Figure 8:
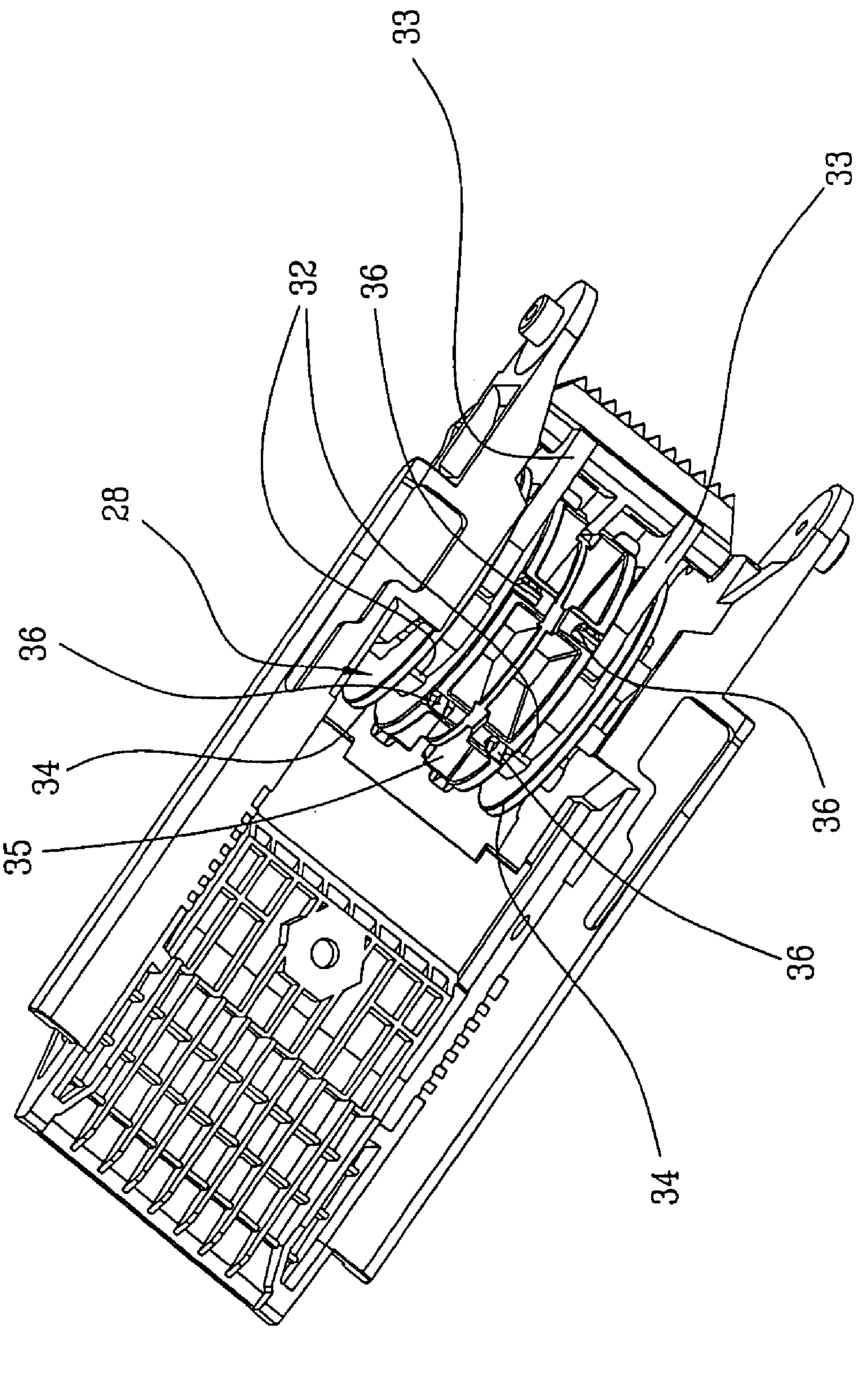
FIG. 8 is a perspective view of a component of the detail of FIG. 7.

With reference to FIG. 1, 2, and in particular to FIGS. 7 and 8, the actuating device 11 comprises at least one driving roller 28 pivotally engaged to the structure 2 along the path of advance of said tape 5 and downstream of the area of application 9 of the labels 6. The driving roller 28 partially defines the path of advance of the tape 5 and it can be actuated in rotation according to a predefined angle of rotation to advance the tape 5 according to a respective predetermined measure of advance.

The driving roller 28 is advantageously connected to the control device 14, so that it is actuated in rotation around a respective axis of rotation "W", substantially parallel to the axes of rotation "X", "Y" and "Z" when the arresting member 12 is in release condition.

Describing more in detail the structure of the actuating device 11, the driving roller 28 has a plurality of actuating projections 29 positioned at both the planar lateral surfaces 28*a* thereof, operatively engaged by an actuating member 30 interposed between the driving roller 28 and the second control portion 18 of the control lever 15 of the control device 14. The actuating member 30 operates, on the action of the control device 14, consecutively on each actuating projection 29 to rotate at constant pitch the driving roller 28 around the respective axis of rotation "W" clockwise and according to a predefined angle of rotation.

More in detail, the actuating member 30 is preferably constituted by a pawl 31 hinged at its ends to the structure 2 between the driving roller 28 and the grip portion 16 of the control device 14.

When the control device 14 moves from the second to the first position on the action of the spring 19*a*, the pawl 31 enmeshes the actuating projections 29 of the driving roller 28 obtaining a stepped rotation thereof around the axis "W".

In order to inhibit any counter-rotations of the driving roller 28 during the movement of the control device 14 from the first to the second position the driving roller 28 is provided with a plurality of locking projections 32 (FIG. 8) operatively engaged by corresponding locking members 33. In particular, the locking projections 32 are obtained circumferentially inside the driving roller 28 and they are accessible through two annular recesses 34. The locking members 33 constitute a one-way pawl mechanism provided with two elastic tongues that intervene on the profile of the locking projections 32.

On the cylindrical surface at the sides of a central annular recess 35, the driving roller 28 has a series of notches 36 able to engage inside corresponding slits (not shown) obtained on the tape 5.

Peripherally to the cylindrical surface of the driving roller 28 is provide an elastic tape-guiding device 37 with arched shape which is fastened removably, at its ends to the structure 2 and it is able to maintain the tape 5 pressed on the driving roller 28.

In particular, the elastic tape-guide device 37 has a first end 37*a* hinged to the structure 2, by means of two pins 37*b*, and a second end 37*c*, hinged to the structure 2, by means of a shaft 37*d* that engages within respective hinging holes 37*e* obtained on the structure of the tape-guide device itself. The tape-guide device 37 is advantageously made elastic by two laminar sections 37*f* that can rotate because they are hinged on the shaft 37*d* through the opening 37*e* so the settling and the phasing of the advance of the tape 5 are assured.

As shown in FIG. 2, both the abutting surface 13 and the actuating device 11 are supported by a portion 2*a* of the structure 2, able to rotate around a hinging axis "K", coinciding with the axis of hinging of the actuating member 30. The displacement of the portion 2*a* of the structure 2, as shown in FIG. 2, defines the aforementioned access opening 8 for the insertion and/or the extraction of the reel 7 for feeding the tape 5.

Figure 6:
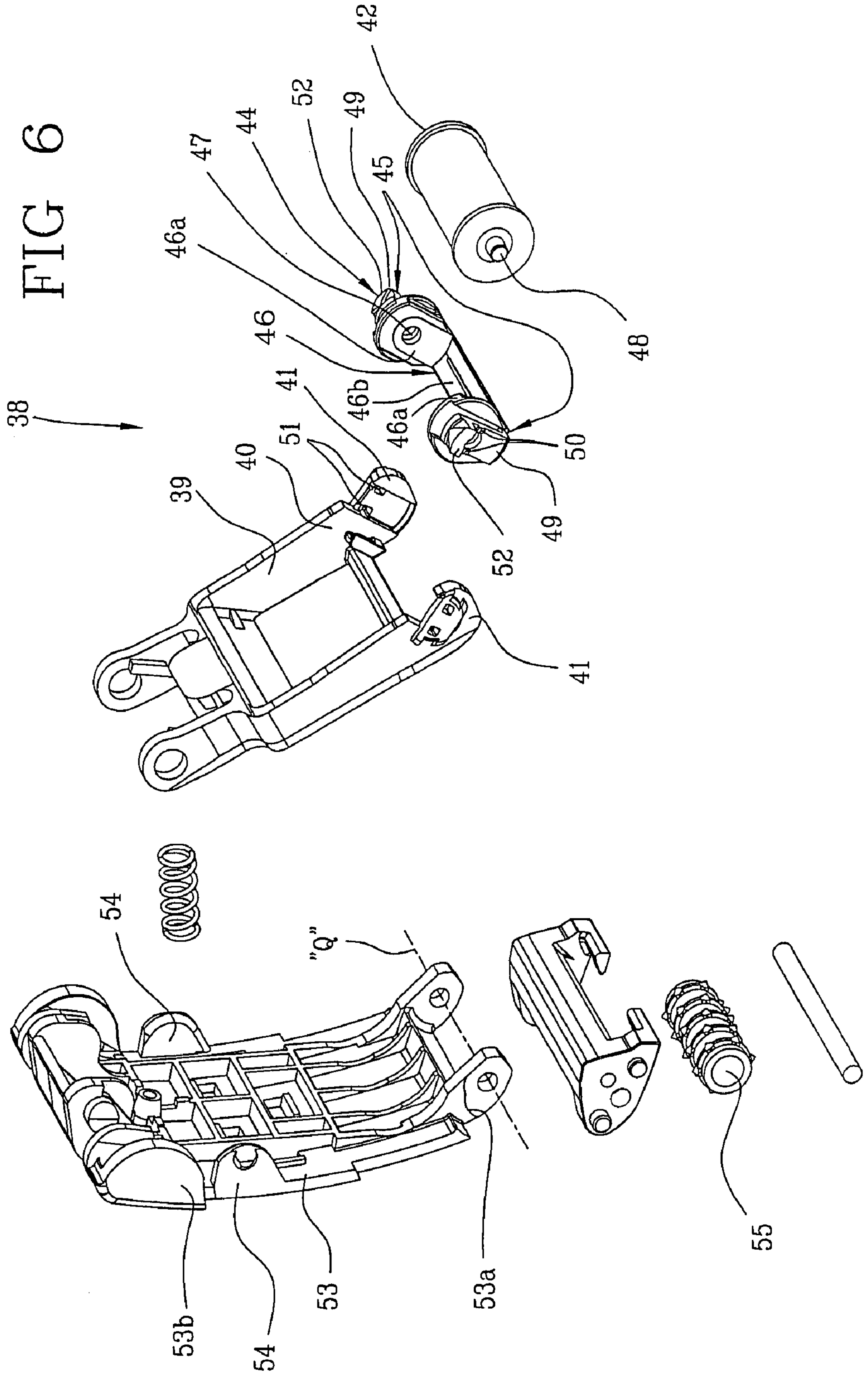
FIG. 6 is a representation of a second detail of the labeling machine of FIGS. 1 and 2, shown in perspective and in exploded view.

Again with reference to FIGS. 1 and 2, and in particular with FIG. 6, the labeling machine 1 comprises a printing device 38 operatively associated to the structure 2 to deposit on at least one label 6 a predefined quantity of ink according to a pre-set motif. The printing device 38 is movable, upon operation of the control device 14, between a condition of rest (FIG. 1) coinciding with the first position of the control device 14 in which the printing member 38 is distanced from the tape 5, and a printing condition coinciding with the second position of the control device 14, in which the printing member 38 operates on a respective label of the tape 5.

Advantageously, the printing member 38 comprises at least one support element or support arm 39 operatively associated to the structure 2 and having a free end 40 preferably provided with two support projections 41. The printing member 38 further comprises at least one inking roller 42 removably engaged to the support element 39 between the support projections 41.

As visible in FIGS. 1 and 2, the printing member 38 is also provided with means for feeding the ink 43 to be provided to the inking roller 42 which are only mentioned here because they do not represent the subject of the present invention. Advantageously, the printing member 38 comprises at least one engagement device 44 (FIG. 6) able to be operatively interposed between the support element 39 and the inking roller 42 to allow, integrally with the inking roller 42, the removable engagement thereof to the support element 39. In other words, the engagement device 44 enables the inking roller 42 to be engaged or removed from the support element 39 within coming in contact with the cylindrical surface of the inking roller 42.

Preferably, the engagement device 44 has snap-in engagement means 45 for the engagement of the inking roller 42 to the support element 39.

With reference again to FIG. 6, the engagement device 44 comprises a substantially "U" shaped roller-holder structure 46 having two lateral portions 46*a*, each provided with a respective seat 47 for the pivotal engagement of a respective longitudinal pivot 48 of the inking roller 42 and a central connecting portion 46*b* interposed between the lateral portions 46*a*.

The engagement device 44 further comprises two elastic connecting elements 49 each operatively engaged externally to a respective lateral portion 46*a* of the roller-holder structure 46. Each elastic connecting element 49 is movable between a first position in which it is distanced from the respective lateral portion 46*a* of the roller-holder structure 46 and a second position in which it is approached to the respective lateral portion 46*a* of the roller-holder structure 46.

Each elastic connecting element 49 has, at opposite side relative to the respective lateral portion 46*a* of the roller-holder structure 46 at least one hitching projection 50, adapted to engage at least one respective hitching seat 51 obtained internally in a respective support projection 41 of the support element 39 and at least one thrust edge 52 through which the hitching projection 50 is displaced from the first to the second position, engaging the respective hitching seat 51 when the roller-holder structure 46 is engaged between the support projections 41 of the support element 39.

As shown in FIGS. 1, 2 and 6, the labeling machine advantageously comprises at least one door 53 having a first end 53*a* hinged to the structure 2 and a second end 53*b*, opposite the first end 53*a*, provided with at least one element 54 for locking the door 53 on the structure. The door 53 is able to rotate around a hinging axis "Q", defined in the first end 53*a*, between a closed position (FIG. 1) in which the structure 2 is closed by the door 53, and an open position (FIG. 2), in which the door 53 is at least partially removed from the structure 2.

Advantageously, the support element 39 of the inking roller 42 is hinged, at the opposite side from its free end 40, to the second end 53*b* of the door 53. According to said connection, the support element 39 is positioned within the structure 2 when the door 53 is in closed position and it is positioned at least partially, preferably completely (FIG. 2) outside the structure 2 when the door 53 is in open position to facilitate accessibility to the inking roller 42.

As shown in FIG. 6, at the axis of hinging "Q" is also pivotally engaged an application roller 55 by means of which it is possible to press the label exiting the corresponding application area against an underlying surface.

The present invention solves the problems observed in the prior art and achieves the proposed objects.

First of all, the subject of the present invention enables structurally to preserve the components of the arresting member as well as the labels borne by the feeding tape.

In particular, the arresting system whose braking or locking action regulates automatically in relation to the positions assumed by the control device prevents the arresting member from being subjected to excessive rubbing friction which lead to rapid structural wear.

It should also be considered that the arrangement of a device for engaging the inking roller like the one described above together with a system for opening and extracting said inking roller like the one represented by the door hinged to the support element of the printing device, facilitates any operation for the maintenance, cleaning and/or replacement of the inking roller without coming in contact with dirty parts thereof, i.e. without intercepting surfaces that are inked for printing the labels.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A labeling machine comprising:

a structure;

at least one member for feeding a tape provided with a plurality of labels associated to said structure;

guiding means associated to said structure to drive said tape at least between said feeding member and an area, defined in said structure, for the application of at least one label, said guiding means defining a path of advance of said tape;

at least one device for actuating said tape positioned in said structure, said actuating device being movable between a non operative condition in which said tape remains in a predetermined position, and an operative condition, in which said actuating device induces in actuation said tape along said path of advance to bring at least one label of said tape to said area of application;

at least one device for arresting said tape operatively positioned in said structure, said arresting device being movable between an arresting position, in which it inhibits the actuation of said tape pressing it against an abutting surface associated to said structure, and a release condition, in which the pressure of said tape against said abutting surface decreases and said tape is free to advance along said path of advance;

at least one control device operatively associated to said structure and operatively connected to said arresting device and actuating device to bring, at said application area, at least one label present on said tape, said control device being movable between a first position in which said arresting device is in condition of arrest and said actuating device is in non operative condition, and a second position in which said arresting device is in release condition and said actuating device is in operative condition;

said arresting device comprising a first element pivotally engaged to said structure to rotate around an axis of rotation, said first element being operatively connected to said control device so that the movement of said control device between the first and the second condition determines the actuation of the arresting device between the arresting condition and the release condition; a second element pivotally engaged to said structure to rotate around said axis of rotation said second element engaging said tape to lock said tape against said abutting surface a when said arresting device is in arresting condition and to allow the advance of said tape along said path of advance when said arresting device is in release condition; at least one elastic connecting element interposed between said first and second element to connect said first and second element whilst allowing relative rotations around said axis of rotation, said elastic connecting element thrusting said second element against said abutting surface when said arresting device is in arresting condition.

2. A labeling machine as claimed in claim 1, wherein: said arresting device comprises two elastic members, preferably traction springs, operatively interposed between a respective hitching portion of said first element and a respective engaging portion of said second element positioned in proximity to each other.

3. A labeling machine as claimed in claim 1, wherein: said arresting device further comprises an auxiliary elastic member, preferably a torsion spring, operatively interposed between an abutting portion of said first element and a contrasting surface of said second element oriented opposite to the abutting surface, said auxiliary elastic member co-operating with said at least one elastic member to enhance the thrusting action of said second element against said contrasting surface when said arresting device is in arresting condition.

4. A labeling machine as claimed in claim 1, wherein: said control device comprises at least one thrust portion directly engaged against one end of said first element of said arresting member opposite said second element, said thrust portion maintaining said arresting member in arresting condition when said control device is in first condition and allowing the reduction of the pressure against the abutting surface when said control device is in second condition.

5. A labeling machine as claimed in claim 1, wherein: said actuating device comprises at least one drive roller pivotally engaged to the structure along said path of advance of said tape and downstream of said area of application of said at least one label, said drive roller partially defining said path of advance of said tape and being able to be actuated in rotation according to a predefined angle of rotation to advance said tape according to a respective predetermined measure of advance.

6. A labeling machine as claimed in claim 5, wherein: said control device is operatively connected to said drive roller to actuate said drive roller in rotation around a respective axis of rotation when said arresting member is in release condition.

7. A labeling machine as claimed in claim 6, wherein: said drive roller comprises:

a plurality of actuating projections operatively engaged by an actuating member interposed between said drive roller and said control device, said actuating member operating, on the action of said control device, consecutively on each actuating projection to rotate said drive roller around the respective axis of rotation and according to a predefined angle or rotation;

a plurality of locking projections operatively engaged by a respective locking member to inhibit rotations in an opposite direction to the rotations imparted by the actuating member to said drive roller.

8. A labeling machine as claimed in claim 1, comprising: at least one printing device operatively associated to said structure to deposit on at least one label borne by said tape a predefined quantity of ink, according to a pre-set motif, said printing device being movable, under the action of said control device, between a resting condition coinciding with the first position of said control device in which said printing device is distanced from said tape, and a printing condition coinciding with the second position of said control device, in which said printing device operates on a respective label of said tape.

9. A labeling machine as claimed in claim 8, wherein: said printing device comprises:

at least one support element operatively associated to said structure, said support element having on free end;

at least one inking roller, removably engaged to said support element.

10. A labeling machine as claimed in claim 9, further comprising: at least one engaging device operatively able to be operatively interposed between said support element and said inking roller to allow, integrally with said inking roller, the removable engagement thereof to the support element.

11. A labeling machine as claimed in claim 10, wherein: said engaging device comprises snap-in engaging means for engaging said inking roller to said support element.

12. A labeling machine as claimed in claim 10, wherein: said engaging device comprises a substantially "U" shaped roller holder structure, comprising two lateral portions each provided with a respective seat for the pivotal engagement of a corresponding longitudinal pivot of said inking roller and a central connecting portion interposed between said lateral portions.

13. A labeling machine as claimed in claim 12, wherein: said engaging device further comprises two connecting elastic members, each operatively engaged externally to a respective lateral portion of said roller-holder structure, each of said two connecting elastic elements being movable between a first position in which it is distanced from the respective lateral portion of said roller-holder structure and a second position in which it is approached to the respective lateral portion of said roller-holder structure.

14. A labeling machine as claimed in claim 13, wherein: each elastic connecting element has, at the opposite part from the respective lateral portion of said roller-holder structure, at least one hitching projection adapted to engage at least one respective hitching seat obtained internally in a respective supporting projection of said support element, and at least one thrust edge whereby the respective hitching projection is moved from the first to the second position, said hitching projection engaging the respective hitching seat when said roller-holder structure is engaged between two supporting projections of said supporting element.

15. A labeling machine as claimed in claim 9, comprising: at least one door having a first end hinged to said structure, and a second end, opposite to said first end, provided with at least one element for locking said door on said structure, said door being able to rotate around a hinge axis defined in said first end between a closed position in which said structure is closed by said door and an open position, in which said door is partly removed from said structure and at least one inner area thereof is accessible from the exterior.

16. A labeling machine as claimed in claim 15, wherein: said support element of said inking roller is hinged, at the side opposite its own free end, to the second end of said door, said support element being positioned within said structure when said door is in closed position and being positioned at least partially, preferably completely, outside said structure when said door is in open position to facilitate access to the inking roller.

17. A labeling machine as claimed in claim 1, comprising: an elastic tape-guide device removably fastened, at its own ends, to the structure to maintain the tape pressed on the drive roller, said elastic tape-guide having a first end hinged to the structure, by means of two pivots, and a second end, hinged to the structure, by means of a shaft which engages within respective hinging holes obtained on the tape-guide device and on two laminar sections partially forming the structure thereof.

18. A labeling machine comprising:

a structure, at least one member for feeding a tape provided with a plurality of labels associated to said structure;

guiding means associated to said structure to guide said tape at least between said feeding member and an application area of at least one label defined in said structure, said guiding means defining a path of advance of said tape;

at least one device for actuating said tape positioned in said structure, said actuating device being movable between a non operative condition in which said tape remains in a predetermined position, and an operative condition, in which said actuating device induces in actuation said tape along said path of advance to bring at least one label of said tape at said application area;

at least one printing device operatively associated to said structure to deposit on at least one label borne by said tape a predefined quantity of ink, according to a pre-set motif, said printing device comprising at least one support element operatively associated to said structure, an inking roller removably engaged to said supporting element and at least one engaging device operatively and integrally engaged to said inking roller to allow the removable engagement thereof on said support element;

an elastic tape-guide device removably fastened, at its own ends to the structure to maintain the tape pressed on the driving roller, said elastic tape-guide device having a first end hinged to the structure by means of two pivots, and a second end, hinged to the structure, by means of a shaft which engages within respective hinging holes obtained on the elastic tape-guide device itself and on two laminar sections partially forming the structure thereof;

at least one control device operatively associated to said structure and operatively connected to said actuation device and printing device, to print said motif on a label and bring said label to said area of application, said control device being movable between a first position in which said actuating device is in non operative condition and said printing device is in resting condition and a second position in which said actuating device is in operative condition and said printing device is in printing condition.

19. A labeling machine as claimed in claim 18, wherein: said engaging device has snap-in engaging means for the engagement of said inking roller to said support element.

20. A labeling machine as claimed in claim 18, wherein: said engaging device comprises a substantially "U" shaped roller-holder structure, having two lateral portions each provided with a respective seat for the pivotal engagement of a respective longitudinal pivot of said inking roller and a central connecting portion interposed between said lateral portions.

21. A labeling machine as claimed in claim 20, wherein: said engaging device further comprises two elastic connecting elements each operatively engaged externally to a respective lateral portion of said roller-holder structure, each elastic connecting element being movable between a first position in which it is distanced from the respective lateral portion of said roller-holder structure and a second position in which it is approached to the respective lateral portion of said roller-holder structure.

22. A device as claimed in claim 21, wherein: each elastic connecting element has, at the opposite side relative to the respective lateral portion of said roller-holder structure, at least one hitching projection adapted to engage at least one respective hitching seat obtained internally in a respective support projection of said support element, and at least one thrust edge whereby the respective elastic connecting element is moved from the first to the second position, said hitching projection engaging the respective hitching seat when said roller-holder structure is engaged between two support projections of said support element.

23. A labeling machine as claimed in claim 18, comprising: at least one door having a first hinged end to said structure, and a second end, opposite said first end, provided with at least one element for locking said door on said structure, said door being able to rotate around a hinging axis defined in said first end between a closed position in which said structure is closed by said door and an open position, in which said door is partly removed from said structure and at least one inner area thereof is accessible from the exterior.

24. A labeling machine as claimed in claim 23, wherein: said support element of said inking roller is hinged, at the side opposite its own free end, to the second end of said door, said support element being positioned within said structure when said door is in closed position and being placed at least partially, preferably completely, outside said structure when said door is in open position to facilitate access to the inking roller.

25. A labeling machine comprising:

a structure;

at least one member for feeding a tape provided with a plurality of labels associated to said structure;

guiding means associated to said structure to drive said tape at least between said feeding member and an area, defined in said structure, for the application of at least one label, said guiding means defining a path of advance of said tape;

at least one device for actuating said tape positioned in said structure, said actuating device being movable between a non operative condition in which said tape remains in a predetermined position, and an operative condition, in which said actuating device induces in actuation said tape along said path of advance to bring at least one label of said tape to said area of application;

at least one device for arresting said tape operatively positioned in said structure, said arresting device being movable between an arresting position, in which it inhibits the actuation of said tape pressing it against an abutting surface associated to said structure, and a release condition, in which the pressure of said tape against said abutting surface decreases and said tape is free to advance along said path of advance;

an elastic tape-guide device removably fastened, at its own ends, to the structure to maintain the tape pressed on the drive roller, said elastic tape-guide having a first end hinged to the structure, by means of two pivots, and a second end, hinged to the structure, by means of a shaft which engages within respective hinging holes obtained on the elastic tape-guide device and on two laminar sections partially forming the structure thereof;

at least one control device operatively associated to said structure and operatively connected to said arresting device and actuating device to bring, at said application area, at least one label present on said tape, said control device being movable between a first position in which said arresting device is in condition of arrest and said actuating device is in non operative condition, and a second position in which said arresting device is in release condition and said actuating device is in operative condition.

* * * * *